United States Patent [19]

Ando

[11] Patent Number: 4,804,835
[45] Date of Patent: Feb. 14, 1989

[54] OPTICAL HEAD HAVING GUIDE MEANS WITH FIRST AND SECOND POLARIZING SURFACES

[75] Inventor: Hideo Andō, Kawasaki, Japan

[73] Assignee: Kabushiki Kaisha Toshiba, Kawasaki, Japan

[21] Appl. No.: 936,444

[22] Filed: Dec. 1, 1986

[30] Foreign Application Priority Data

| Nov. 30, 1985 | [JP] | Japan | 60-269614 |
| Dec. 4, 1985 | [JP] | Japan | 60-273057 |
| Feb. 26, 1986 | [JP] | Japan | 61-40709 |
| Mar. 5, 1986 | [JP] | Japan | 61-47702 |
| Apr. 30, 1986 | [JP] | Japan | 61-100754 |
| May 14, 1986 | [JP] | Japan | 61-109912 |

[51] Int. Cl.$^4$ .............................. G11B 5/09
[52] U.S. Cl. .................... 250/201; 369/45
[58] Field of Search ........... 250/201 DF, 204, 216, 250/570; 356/125, 126; 369/44–46, 112, 118

[56] References Cited

U.S. PATENT DOCUMENTS

| 4,079,248 | 3/1978 | Lehureau et al. | 250/201 |
| 4,334,300 | 6/1982 | Arquie et al. | 369/46 |
| 4,455,085 | 6/1984 | Kato et al. | 250/201 DF |
| 4,634,853 | 1/1987 | Kanamaru | 250/201 DF |

FOREIGN PATENT DOCUMENTS

| 0088662 | 2/1983 | European Pat. Off. |
| 0107461 | 10/1983 | European Pat. Off. |
| 2313716 | 12/1976 | France |
| 2072877 | 10/1981 | United Kingdom |

OTHER PUBLICATIONS

Japanese Abstract vol. 9, No. 167 (P-372) (1890) 12th Jul. 1985; & JP-6043240 (Mitsubishi Denki K.K.) 07-03-1985.
European Reports.

Primary Examiner—David C. Nelms
Assistant Examiner—Stephen B. Allen
Attorney, Agent, or Firm—Cushman, Darby & Cushman

[57] ABSTRACT

In an optical head, a laser beam emitted from a semiconductor laser is collimatted by a convex lens and is reflected by a polarizing surface of a prism. The reflected laser beam passing through a quarter wave plate is converged by an objective lens onto an optical disk. The laser beam reflected from an optical disk is returned to the prism through the objective lens and quarter wave plate. The returned laser beam passes through the polarizing surface and is reflected from two segment surfaces of a prism coupled to the prism. The laser beam is reflected and separated into two beams by the segment surfaces. The separated beams passing through the polarizing surface are converged by the convex lens onto a photodetecting unit located close to the semiconductor laser.

29 Claims, 10 Drawing Sheets

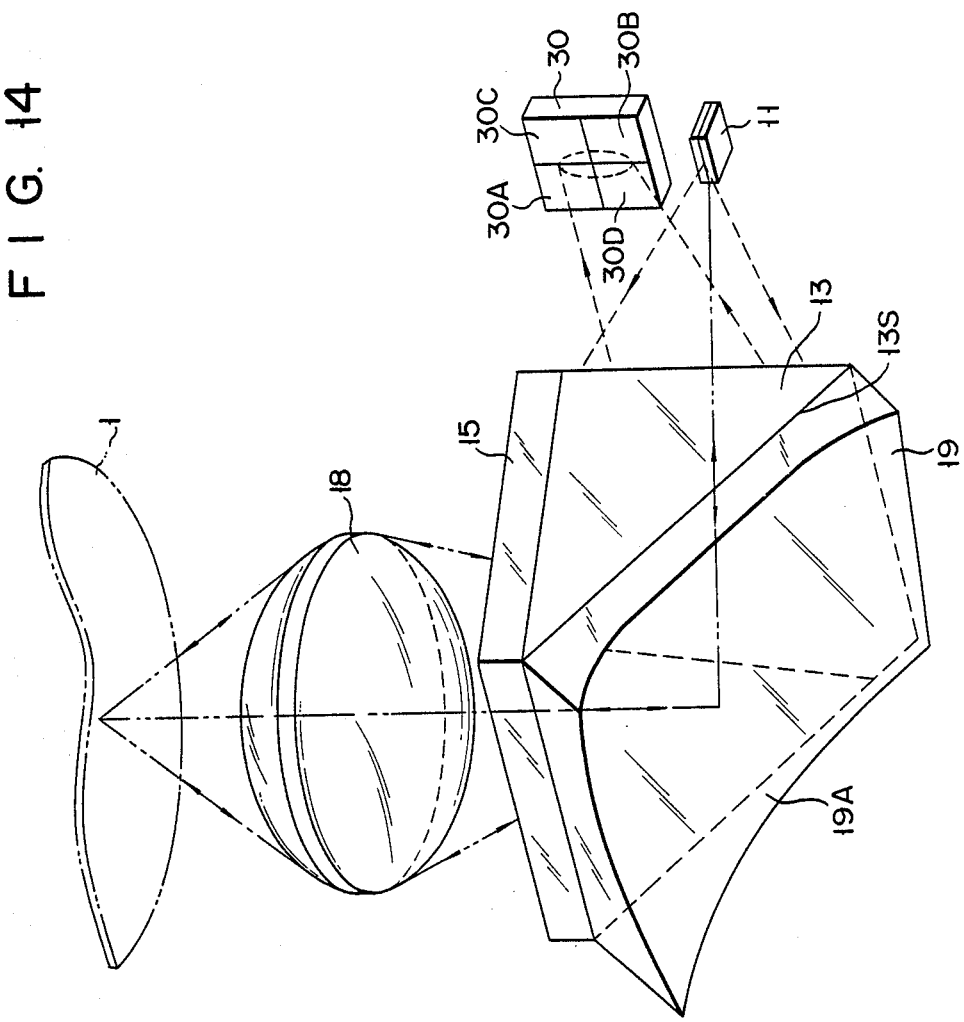

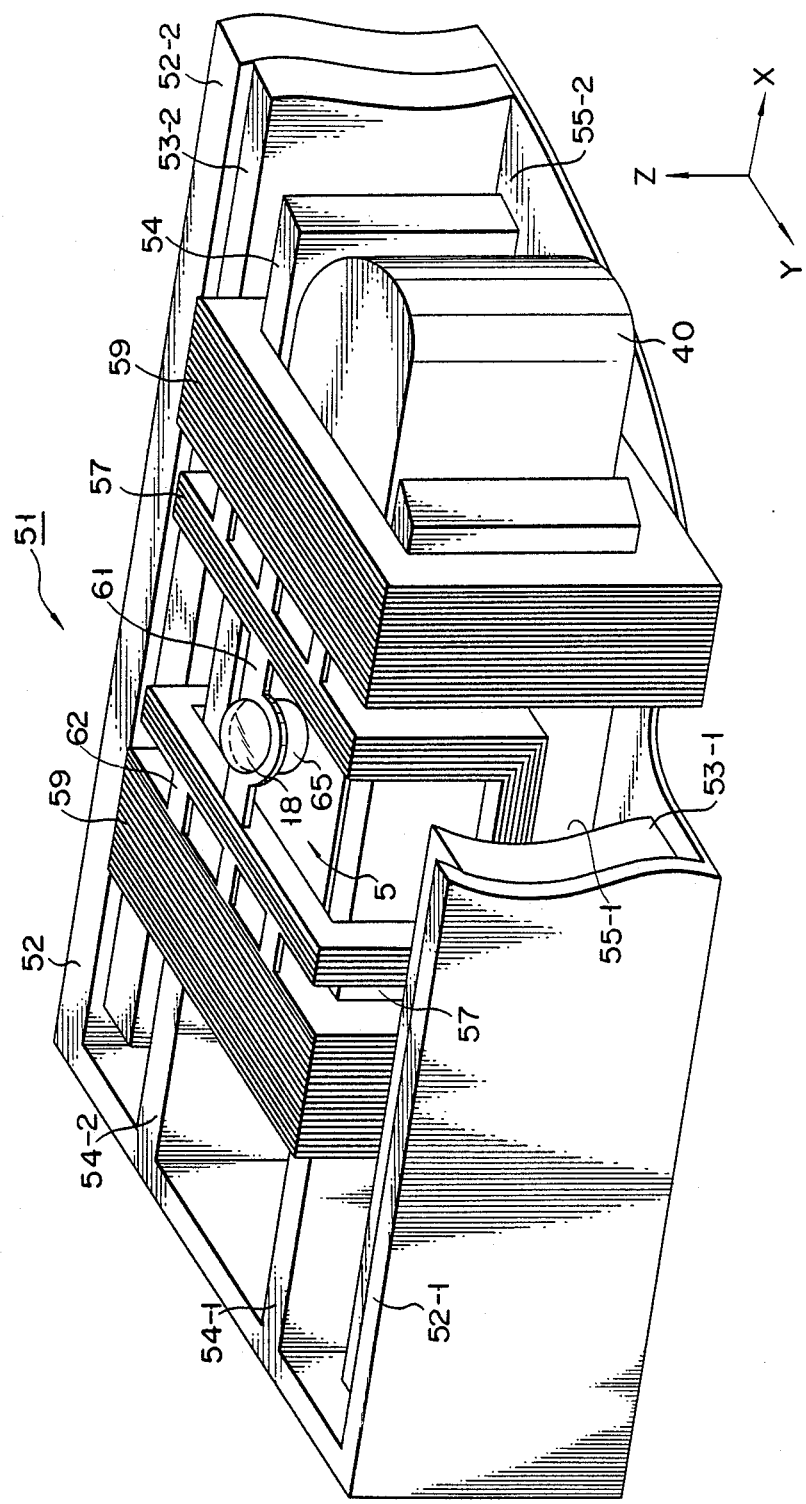

OPTICAL HEAD HAVING GUIDE MEANS WITH FIRST AND SECOND POLARIZING SURFACES

BACKGROUND OF THE INVENTION

The present invention relates to an optical system capable of retrieving information from an optical memory by means of focused light beams.

In general, in an optical system used in an optical head of an information retrieving apparatus, a laser beam emitted from a semiconductor laser is collimated by a collimator lens. Then, the collimated beam is passed through a polarized beam splitter and a quarter-wave plate, and focused on an optical memory, having a spiral or concentric track, by an objective lens. The laser beam, reflected by the optical memory, is returned to the beam splitter via the objective lens and the quarter-wave plate. Resultant light beams, reflected by the splitter to be transferred to the memory, are directed toward different optical paths. The reflected laser beams from the splitter are converged on a photodetector by a projection lens, to be detected by the photodetector. Thus, information is read from the optical memory, a focusing state of the objective lens is detected, and whether or not a desired track of the memory is traced correctly with the focused laser beam, is determined.

Examples of the prior art optical system of this type are disclosed in U.S. Pat. Nos. 4,521,680; 4,585,933 and 4,546,460, by Ando.

In the conventional optical system, the laser beam directed to the optical memory, and the laser beam, reflected from the memory and directed toward the photodetector, are transferred along the same optical path, between the polarized beam splitter and the memory. However, different optical paths lie between the splitter and semiconductor laser and between the splitter and photodetector, therefore, the semiconductor laser can next be located not to the photodetector. Thus, the prior art optical system cannot readily be reduced in size. Moreover, the convex collimater lens is located between the beam splitter and semiconductor laser, and the convex projection lens is located between the splitter and photodetector. Thus, two different lenses are needed separately for the beam collimation and beam convergence. As a result, the optical system is inevitably heavy in weight, so that the access time, required in retrieving specific data by moving the system, is longer than those of magnetic disk apparatuses. As compared with the minimum access time of about 30 ms for the magnetic disk apparatuses, the access time of optical information recording/retrieving apparatuses is as long as about 100 ms.

SUMMARY OF THE INVENTION

The object of the present invention is to provide an optical head, permitting reduction in size and weight and hence, shorter access time.

According to the present invention, there is provided an optical system for use with an optical memory, comprising: means for emitting a light beam; means for converging the light beam, emitted from the light emitting means, on the optical memory, and transferring the resultant light beam reflected by the memory; means for detecting the light beam emerging from the converging means, said detecting means being disposed close to the light emitting means; first reflecting means for reflecting the light beam, emitted from the light emitting means, toward the converging means; and second reflecting means for reflecting the resultant light beam, emerging from the converging means, toward the detecting means.

According to the present invention, there is also provided a system for use with an optical memory, comprising: means for emitting a light beam; means for converging the light beam, emitted from the light emitting means, on the optical memory, and transferring the resultant light beam reflected by the memory; means for detecting the light beam emerging from the converging means, said detecting means being disposed close to the light emitting means; a frame assembly in which the reflecting means and converging means are received; means for generating an access signal for accessing a predetermined tracking guide; and means for generating a tracking error signal; means for driving the frame along a first direction in reponse to one of the access signal and the tracking error signal.

BRIEF DESCRIPTION OF THE DRAWINGS

FIG. 14 is a perspective view of an optical system of an optical head according to a still further embodiment of the invention; and FIG. 15 is a perspective view of a drive mechanism for driving the optical head shown in FIG. 1.

DETAILED DESCRIPTION OF THE PREFERRED EMBODIMENTS

Figure 1:
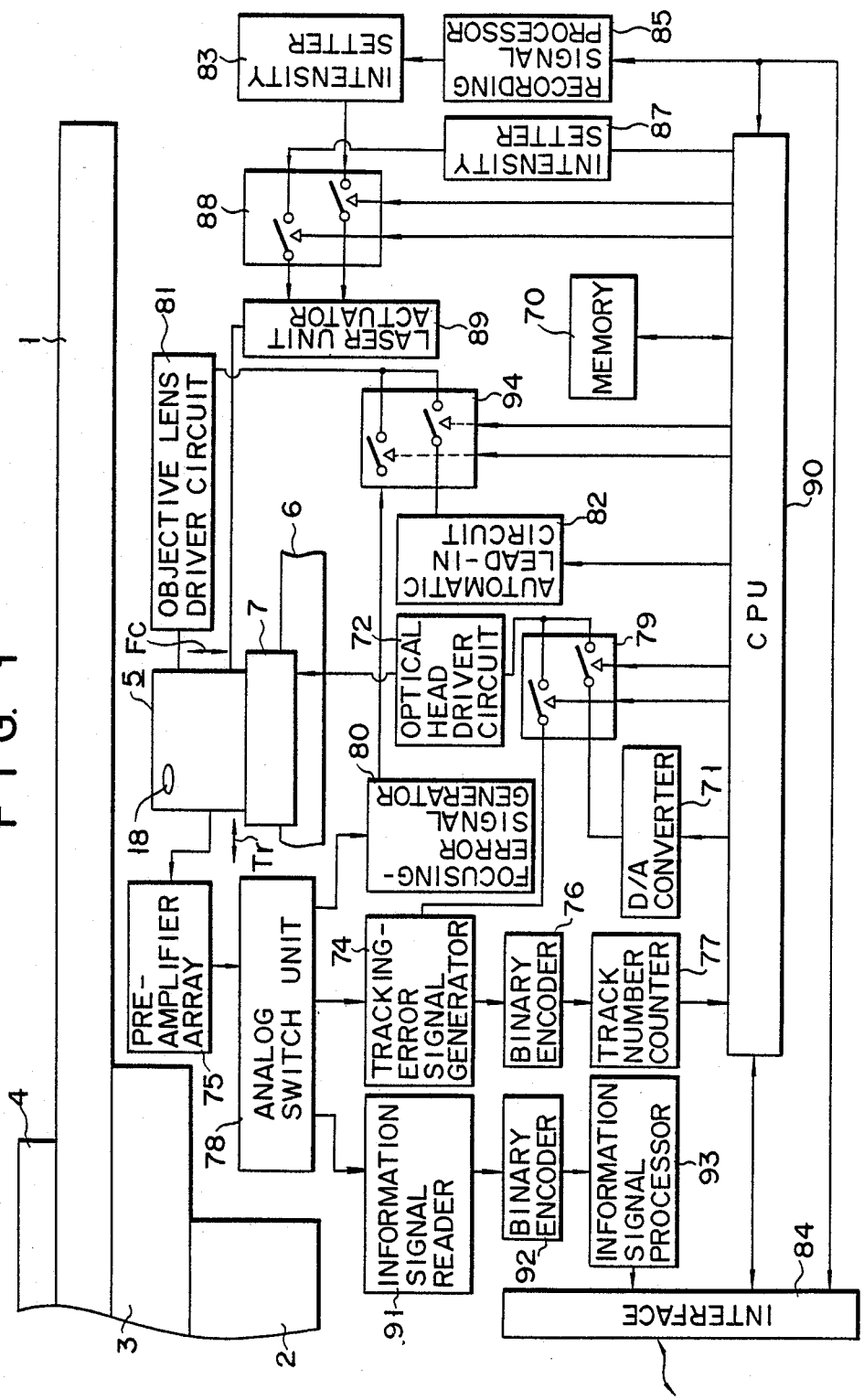
FIG. 1 is a block diagram of a circuit for driving an optical head according to the present invention.

As shown in FIG. 1, an optical memory, e.g., optical disk 1, is mounted on turntable 3, which is rotated by driving shaft 2. Clamper 4 is disposed on disk 1 so as to hold the disk against turntable 3. Disk 1 has a record layer at least on its one side. Information can be recorded on or retrieved from the record layer. The layer is formed with a spiral or concentric tracking guide.

Figure 2:
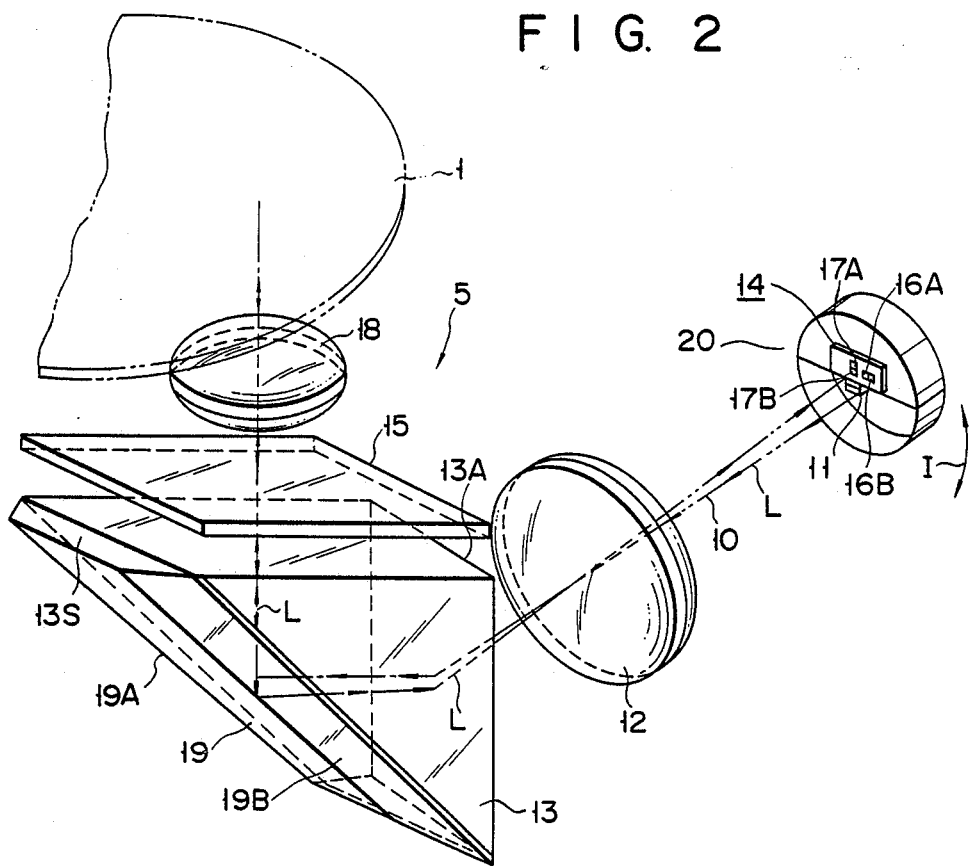
FIG. 2 is a perspective view of an optical head according to an embodiment of the invention.

Provided under disk 1 is optical head 5, which includes an optical system as shown in FIG. 2. Head 5 is mounted on carrier block 7, which is disposed within guide frame 6 so as to be slidable in the radial direction of disk 1.

In optical head 5, as shown in FIG. 2, semiconductor laser 11 is disposed on optical axis 10 of convex lens 12, which serves both as a collimator lens and a projection lens. The light emitting point of laser 11 is located on the focal plane of lens 12. Photodetector 14 is disposed close to laser 11. Laser 11 and photodetector 14 are fixed on mount 20. Divergent laser beam L is emitted from laser 11. As it passes through lens 12, the beam is converted into a collimated laser beam, and then projected on prism 13. Since prism 13 has its incidence surface 13A inclined relatively to optical axis 10 of lens 12, the cross section of the collimated laser beam is changed from an elliptic shape to a substantially circular one, as the beam, incident on surface 13A, is refracted. As it advances in prism 13, the laser beam is reflected by polarizing surface 13S on the opposite side of the prism. Then, after passing through quarter-wave plate 15, the beam is converged on optical memory 1 by objective lens 18.

Thus converged on optical memory 1, the laser beam is reflected by the memory. The reflected beam is introduced into prism 13 through objective lens 18 and quarter-wave plate 15, and then returned to polarizing surface 13S. Hereupon, as the laser beam reciprocates through plate 15, its oscillating direction is turned 90°. Thus, the beam is converted into a linearly polarized laser beam by plate 15. Returned to surface 13S, the laser beam is transmitted through it to be introduced into prism member 19, which is coupled to surface 13S and serves to separate the beam.

Figure 3:
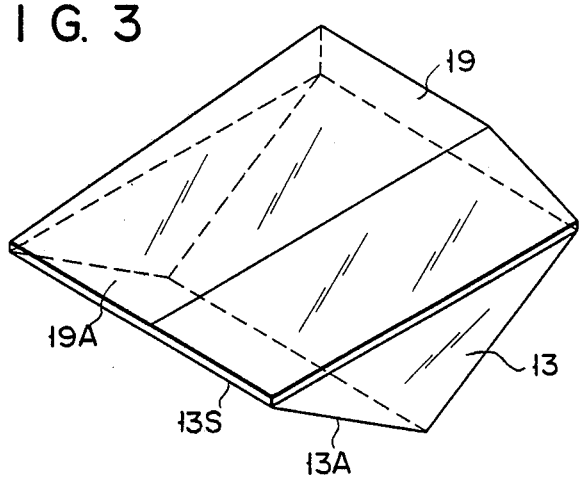
FIG. 3 is a perspective view of a beam splitter shown in FIG. 2.

As shown in FIG. 3, prism member 19 has first and second total-reflection surfaces 19A and 19B, which adjoin at a certain angle to each other, extending nonparallel to polarizing surface 13S. The boundary line between surfaces 19A and 19B extends substantially at right angles to the extending direction of the tracking guide, on optical memory 1, or that of an image of the tracking guide projected on photodetector 14. Preferably, first surface 19A is flat, and second surface 19B is a cylindrical convex-lens surface with functions as an astigmatic surface. Surfaces 19A and 19B are not limited to these configurations, and may be formed individually of any nonspherical surfaces with different single or complex radii of curvature.

The laser beam, reflected by total-reflection surfaces 19A and 19B, are separated into first and second laser beams directed differently. Then, the beams pass again through polarizing surface 13S to be incident on convex lens 12. Lens 12 directs the fist and second laser beams L1 and L2 to photodetector 14, which is located adjacent to semiconductor layer 11, and is fixed together therewith on single mount 20. Photosensitive regions 16A, 16B, 17A and 17B of photodetector 14, like the light emitting point of laser 11, are located substantially on the focal plane of lens 12. The first laser beam, reflected by reflecting surface 19A, is converged on a pair of photosensitive regions 16A and 16B for focusing-error detection. The second laser beam, reflected by reflecting surface 19B, is projected on a pair of photosensitive regions 17A and 17B for detecting a tracking-error from a diffraction pattern, which is produced when the laser beam is diffracted by the tracking guide. Reflected by surface 19B, the second laser beam is given astigmatism by surface 19B which functions as an astigmatic surface. Accordingly, a beam spot formed on regions 17A and 17B is elongated at right angles to the extending direction of the tracking guide, on optical memory 1, or that of the image of the guide projected on photodetector 14. Refer to U.S. Pat. Nos. 4,585,933 and 4,546,460 and U.S. patent application Ser. No. 817,259, by Ando, for the principle of the knife-edge method, in which focusing-error can be detected from the deflection of laser beam and tracking-error can be detected from a diffraction pattern found in a beam spot.

Figure 4:
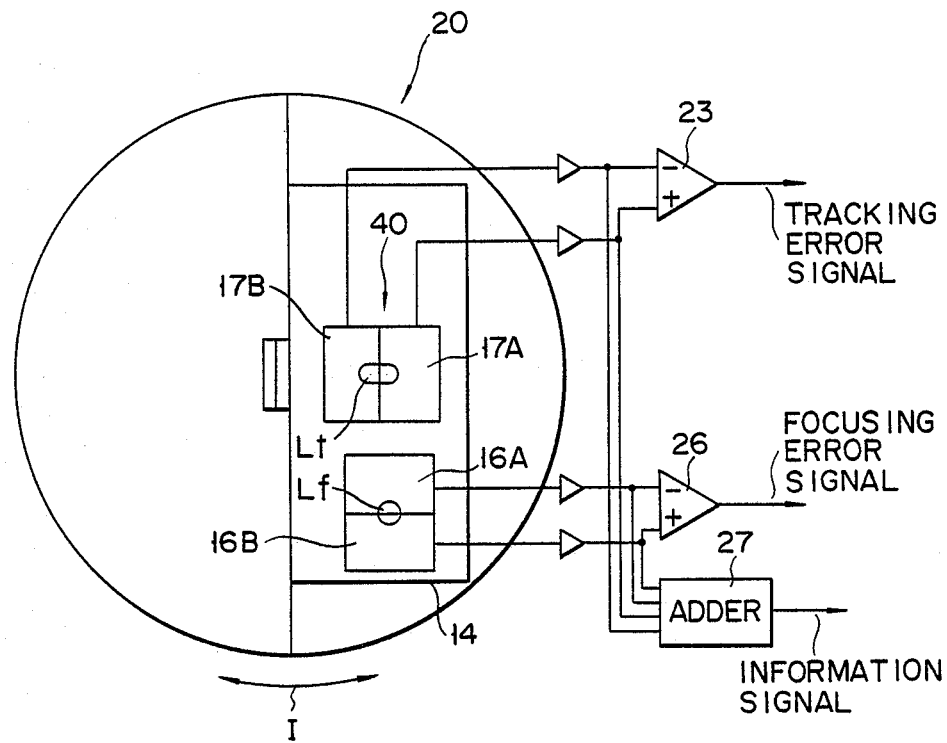
FIG. 4 is a plan view showing an arrangement of a mount shown in FIG. 2, and a photodetector and a semiconductor laser on the mount.

If objective lens 18 is in a focusing state, as shown in FIG. 4, the first laser beam is directed to a photosensitive region between photosensitive regions 16A and 16B of photodetector 14, so that photoelectric signals of equal levels are delivered from regions 16A and 16B. Thus, differential amplifier 26 produces a focusing-error signal of a zero level, which is indicative of the focusing state of lens 18. If lens 18 is in a defocusing state, the first laser beam is directed to either region 16A or 16B of photodetector 14, so that photoelectric signals of different levels are delivered from regions 16A and 16B. Thus, amplifier 26 produces a focuing-error signal of a plus or minus level, which is indicative of the defocusing state of lens 18. If lens 18 is directed toward a desired track so that the track is traced correctly with the laser beam, diffraction patterns of equal areas are produced in second and third laser beam spots on photosensitive regions 17A and 17B. As a result, photoelectric signals of equal levels are delivered from regions 17A and 17B. Accordingly, differential amplifier 23 produces a tracking-error signal of a zero level, which indicates that the desired track is traced correctly with the laser beam. If the desired track is not tracted correctly, diffraction patterns of different areas are produced in the second and third laser beam spots on regions 17A and 17B. As a result, photoelectric signals of different levels are delivered from regions 17A and 17B. Accordingly, amplifier 23 produces a tracking-error signal of a plus or minus level, which indicates that the desired track is not traced correctly. The photoelectric signals from photosensitive regions 16A, 16B, 17A and 17B are added by adder 27, thus providing an information signal.

In the embodiment described above, prism member 19 is directly coupled to prism 13. However, prism member 19 may be so arranged as to be separated from the prism 13.

Figure 6:
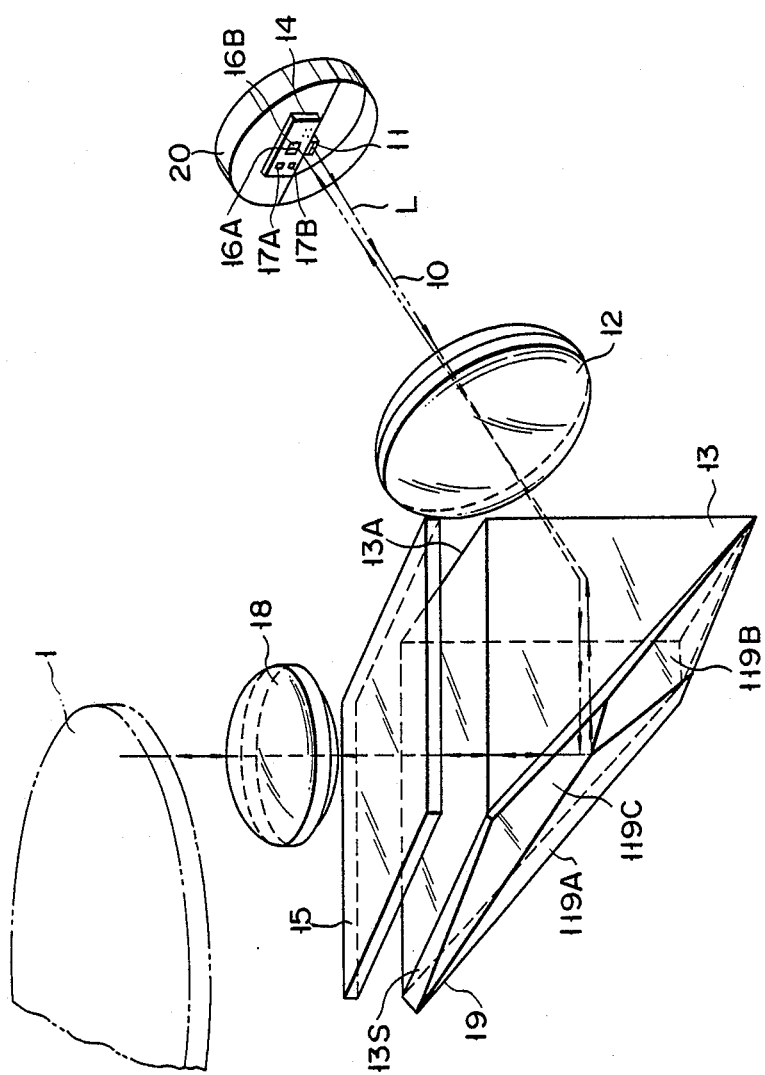
FIG. 6 is a perspective view of an optical system of an optical head according to another embodiment of the invention.
Figure 7:
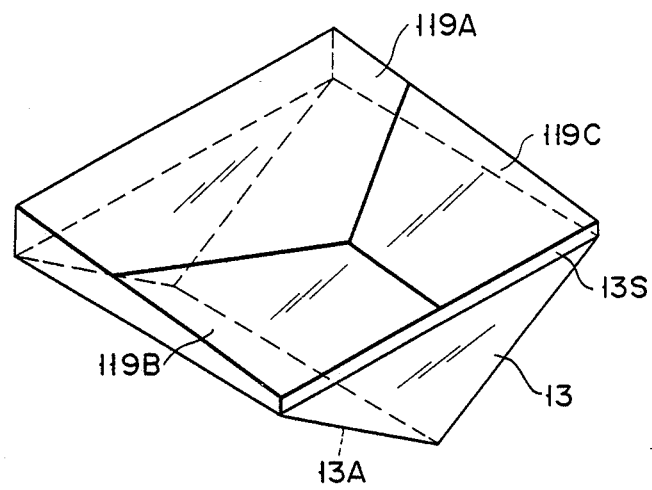
FIG. 7 is a perspective view of a beam splitter shown in FIG. 6.

In the embodiment described above, prism 13 has incidence surface 13A, which is inclined relatively to optical axis 10 of convex lenas 12. Therefore, the cross section of the collimated laser beam is changed from an elliptic shape to a circular one, as the beam, incident on surface 13A, is refracted. Also, the laser beam, reflected by the reflecting surface of prism 13 and directed to convex lens 12, is refracted by surface 13A. Thus, the cross-sectional shape of the beam is changed, and the beam diameter is increased substantially. As the beam diameter is increased in this manner, the image magnification of the optical system is enlarged, so that the focusing-error sensing capability of the system can be improved, as disclosed in U.S. patent application Ser. No. 742,396, filed on Jun. 7, 1985, by Ando. Especially in the optical system using the knife-edge method, as shown in FIGS. 2 and 6, the laser beam is elongated in the direction of deflection, in accordance with the size of tracking-error. Accordingly, the susceptibility of the laser beam to deflection is increased, so that the focusing-error sensing capability of the system is improved particularly.

Figure 5:
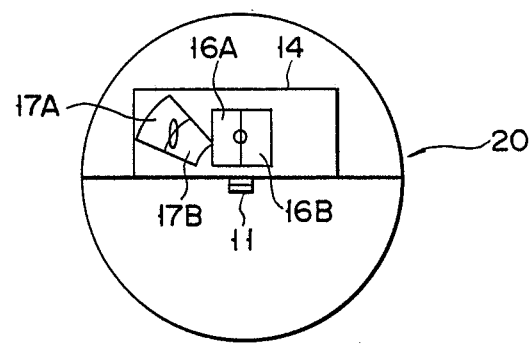
FIG. 5 is a plan view showing a modification of the arrangement of the mount, photodetector, and semiconductor laser shown in FIG. 4.

As shown in FIGS. 2 and 4, mount 20 is in the form of a cylindrical part rotatable in the direction of arrow I. The center of rotation of mount 20 is in alignment with the optical axis of convex lens 12, so that the light emitting point of semiconductor laser 11 is located on the center of mount 20. Thus, even though mount 20 is rotated, the laser beam can travel in an optical path along a fixed optical axis. If mount 20 is rotated in direction I, photosensitive regions 16A and 16B for focusing-error detection are rotated in the same direction. That is, first laser beam 4 is focused on a predetermined point when objective lens 18 is in the focusing state and photosensitive regions 16A, 16B are moved to the predetermined point when the mount 20 is rotated in the direction I. In other word, this means that the beam spot is moved substantially in the circumferential direction of mount 20, on regions 16A and 16B. In assembling or adjusting optical head 5, therefore, the optical system for focus detection can be adjusted easily by rotating mount 20 so that the beam spot is formed on the photosensitive region between regions 16A and 16B, while keeping objective lens 18 in the focusing state. In adjusting the optical system for tracking-guide detection, polarizing prism 13 is shifted along a ridge line between first and second surfaces 19A, 19B so as to form the beam spot equally distributed on photosensitive regions 17A and 17B for tracking-guide detection, while keeping lens 18 in the focusing state. The first laser beam spot Lf is not shifted on photodetector 14 and only the second laser beam spot Lt is shifted along a direction along which photosensitive regions 17A, 17B is arranged, when objective lens 18 is maintained in the focusing state and polarizing prism 13 is shifted along the ridge line between first and second reflecting surfaces 19A, 19B. Preferably, regions 16A and 16B for focusing-error detection and regions 17A and 17B for tracking-guide detection are arranged on mount 20, in the radial direction thereof, as shown in FIG. 5. Since mount 20 is rotatable and the light emitting point of semiconductor laser 11 is located on the center of rotation of mount 20, so the optical system can be adjusted with ease. To facilitate the adjustment of the optical system, mount 20 and convex lens 12 is supported by a lens barrel (not shown) for joint rotation.

Figure 8:
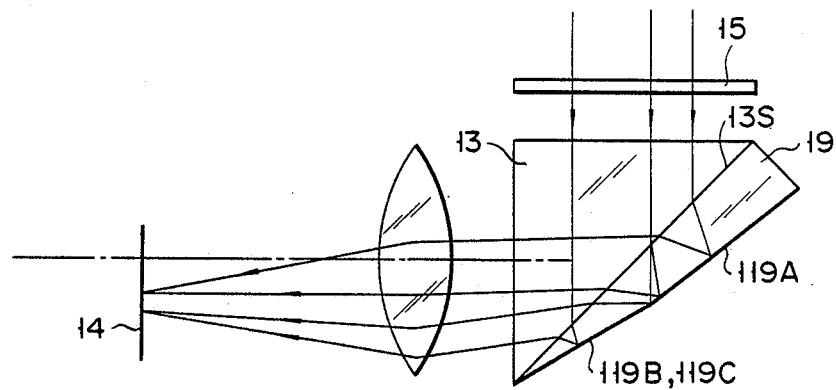
FIG. 8 is a side view showing the optical system of FIG. 6 and traveling path of light beams therein.

Referring now to FIG. 6, an optical system of an optical head according to anther embodiment of the present invention will be described. In the optical system shown if FIG. 6, prism member 19, which is disclosed in U.S. patent application Ser. No. 862,829, filed on May 13, 1986, by Ando, has three total-reflection surfaces 119A, 119B and 119C which adjoin at a certain angle to one another, extending nonparallel to polarizing surface 13S. The boundary line between surfaces 119B and 119C extends substantially in the extending direction of the tracking guide, on optical memory 1, or that of an image of the tracking guide projected on photodetector 14. The laser beam, reflected by total-reflection surfaces 119A, 119B and 119C, are separated into first, second and third laser beams L1, L2 and L3 directed differently, as shown in FIG. 8. Then, the beams pass again through polarizing surface 13S to be incident on convex lens 12. Laser beams L1, L2 and L3 are directed to photodetector 14. The first laser beam, reflected by reflecting surface 119A, is converged on a pair of photosensitive regions 16A and 16B for focusing-error detection. The second and third laser beams, reflected by reflecting surfaces 119B and 119C, respectively, are converged on a pair of photosensitive regions 17A and 17B arranged separately.

Thus, if objective lens 18 is in the focusing state, photoelectric signals of equal levels are delivered from regions 16A and 16B, and differential amplifier 23 produces a focusing-error signal of a zero level. If lens 18 is in the defocusing state, the first laser beam is directed to either region 16A or 16B of photodetector 14, so that photoelectric signals of different levels are delivered from regions 16A and 16B, and amplifier 23 produces a focusing-error signal of a plus or minus level. If a desired track is traced correctly with the laser beam, diffraction patterns of equal areas are produced in second and third laser beam spots on photosensitive regions 17A and 17B. As a result, photoelectric signals of equal levels are delivered from regions 17A and 17B. Accordingly, differential amplifier 26 produces a tracking-error signal of a zero level. If the desired track is not traced correctly, diffraction patterns of different areas are produced in the second and third laser beam spots on regions 17A and 17B. As a result, photoelectric signals fo different levels are delivered from regions 17A and 17B. Accordingly, amplifier 26 produces a tracking-error signal of a plus or minus level. The photoelectric signals from photosensitive regions 16A, 16B, 17A and 17B are added by an adder, thus providing an information signal.

Figure 9:
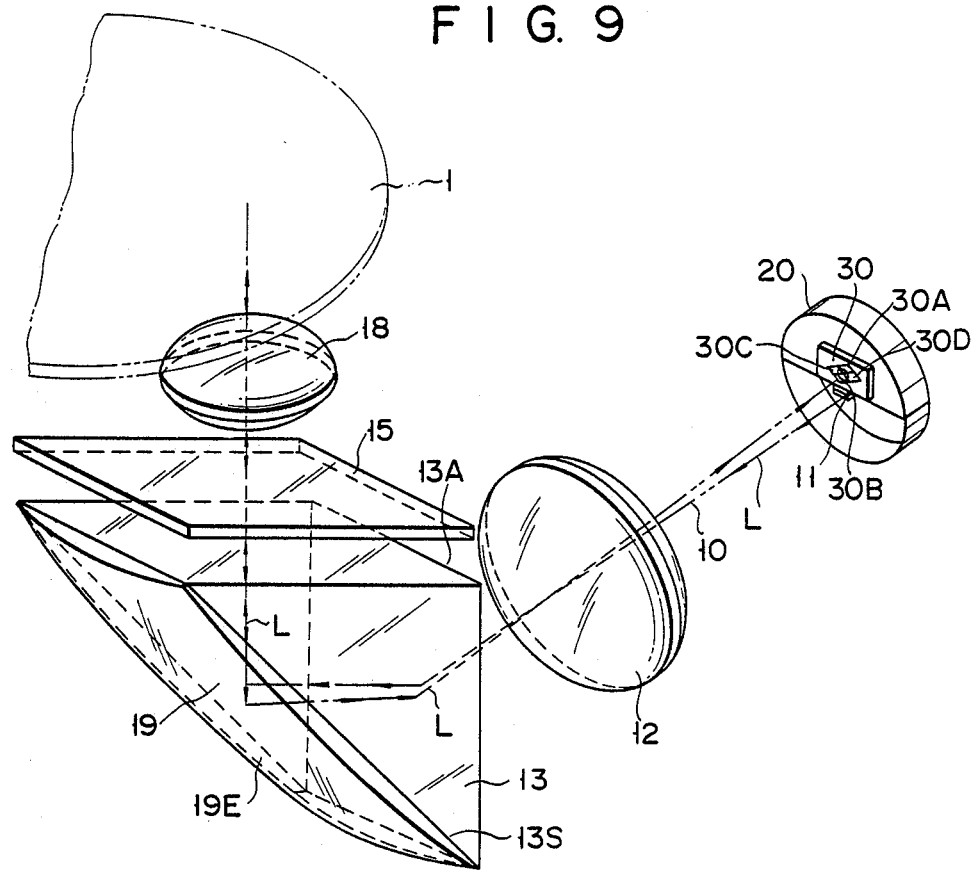
FIG. 9 is a perspective view of an optical system of an optical head according to still another embodiment of the invention.

Referring now to FIG. 9, an optical system of an optical head according to still another embodiment of the invention will be described. In the optical systems shown in FIGS. 2 and 6, the knife-edge method is used as the method of focus detection. In the optical system shown in FIG. 9, however, the focus is detected by the so-called astigmatism method, as disclosed in U.S. Pat. No. 4,023,033, by Thomson. In the system of FIG. 9, therefore, total-reflection surface 19E of prism member 19 is in the form of a nonspherical surface, e.g., a cylindrical convex surface, which functions as an astigmatic surface. The base axis of surface 19E is inclined at a certain angle, e.g., 45°, to the plane which contains an optical axis, passing through prism 13 and the light emitting point of semiconductor laser 11, and another optical axis passing through prism 13 and objective lens 18. Detector 30, like the one used in a conventional astigmatic optical system, includes first, second, third, and fourth sensitive regions 30A, 30B, 30C and 30D.

Figure 10:
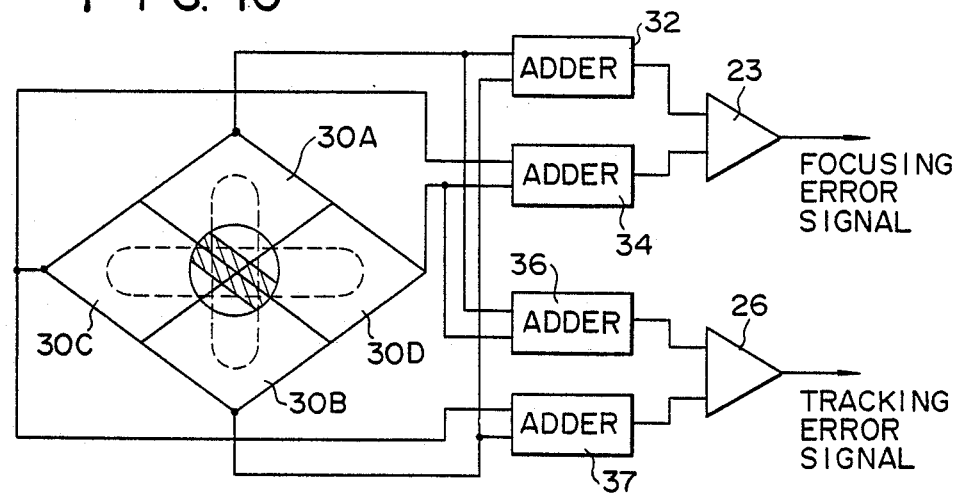
FIG. 10 is a plan view of a detector shown in FIG. 9.

In the optical system shown in FIG. 9, astigmatism is given to a laser beam reflected by total-reflection surface 19E, and the reflected beam is converged on sensitive regions 30A to 30D by convex lens 12. When objective lens 18 is in the focusing state, a circular beam spot is formed on regions 30A to 30D, as indicated by full line in FIG. 10. When lens 18 is in the defocusing state, an elongated beam spot is formed, extending along a photosensitive region between regions 30A to 30D, as indicated by broken line in FIG. 10. Accordingly, differential amplifier 23 is supplied with a summation output from adders 32 and 34, thus producing a focusing-error signal. Adder 32 adds photoelectric signals from first and second sensitive regions 30A and 30B, while adder 34 adds photoelectric signals from third and fourth sensitive regions 30C and 30D. As indicated by hatching in FIG. 10, moreover, an image or diffraction pattern of a track is formed in the beam spot on regions 30A to 30D. Accordingly, differential amplifier 26 is supplied with a summation output from adders 36 and 37, thus producing a tracking-error signal. Adder 36 adds photoelectric signals from first and fourth regions 30A and 30D, while adder 37 adds photoelectric signals from second and third regions 30B and 30C.

Figure 11:
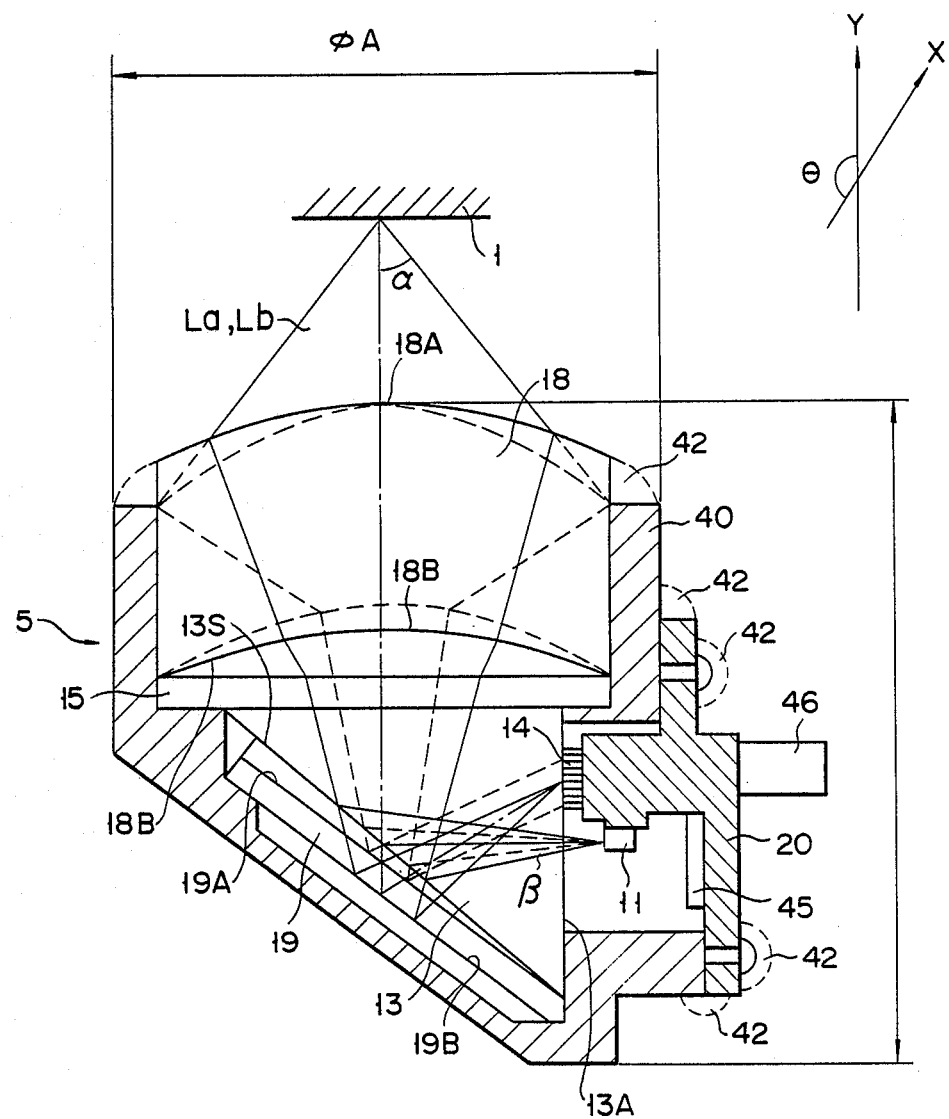
FIG. 11 is a sectional view showing an optical system of an optical head and its frame according to a further embodiment of the invention.
Figure 12:
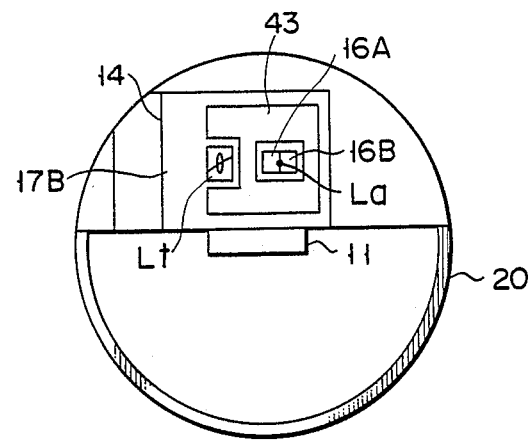
FIG. 12 is a plan view showing an arrangement of a mount shown in FIG. 11, and a photodetector and a semiconductor laser on the mount.

Referring now to FIG. 11, a further embodiment of the present invention will be described. In optical head 5 of this embodiment, a compact optical system is assembled without the use of convex lens 12, based on the knife-edge method. As shown in FIG. 12, semiconductor laser 11, for use as a light source, is provided with emitting point 11A for emitting recording/retrieving laser beam. Recording/retrieveing laser beam La is diverged from lasers 11, and is incident on prism 13. Incident surface 13A is a flat surface perpendicular to the optical axes of laser 11, so that the divergent laser beams pass through surface 13A without any change.

Laser beam L, incident on incidence surface 13A of prism 13, are reflected substantially 100 percent by polarizing surface 13S on another side of prism 13, and pass through quarter-wave plate 15 to be changed into circular polarized laser beams. The polarized laser beams are focused on optical memory 1 through objective lens 18. Lens 18, whose incidence and emergence surfaces are both nonspherical, are made of transparent optical material, such as glass or platics.

Divergence angle $\beta$ of recording/retrieving laser beam L varies, depending on whether the beams are viewed parallel to the drawing plane of FIG. 11 (full-line trace), or whether the beams are viewed at right angles to the drawing plane (broken-line trace). Corresponding to the variation of angle $\beta$, nonspherical surfaces 18A and 18B of objective lens 18 are given a radius of curvature which also varies, as indicated by full- and broken-line curves, depending on the viewing direction. Thus, when the laser beams are directed from lens 18 to optical memory 1, their convergence angle $\alpha$ is fixed without regard to the viewing direction. Thus, recording/retrieving laser beam L forms a substantially circular beam spot on memory 1. Usually, divergence angle $\beta$ of beam L is as narrow as $\pm 10°$ to $\pm 20°$. In order to form a small enough beam spot on memory 1, however, convergence angle $\alpha$ must be wide. Therefore, nonspherical surface 18B of objective lens 18, facing quarter-wave plate 15, is in the form of a concave-lens surface, from which the laser beams diverge. The radius of curvature of surface 18B varies, corresponding to the variation of divergence angle $\beta$ of beam L which depends on the veiwing direction. Nonspherical surface 18A of lens 18, facing optical memory 1, is in the form of a convex-lens surface, which serves to converge laser beam L. Ratio $\alpha/\beta$ of convergence angle $\alpha$ of the laser beams to divergence angle $\beta$ approximately indicates the lateral image magnification.

Figure 13A:
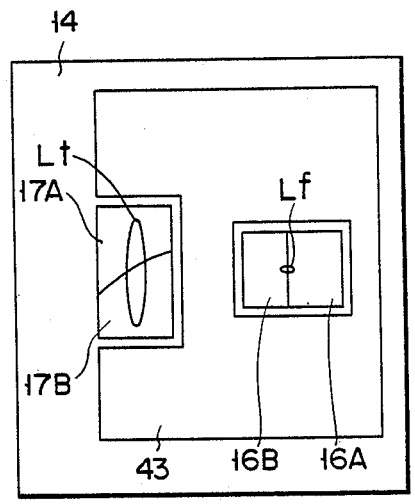
FIG. 13A and 13B are plan views of a detector shown in FIG. 11.

Laser beam L, converged on optical memory 1, are reflected by the memory, introduced into prism 13 again through objective lens 18 and quarter-wave plate 15, and then returned to polarizing surface 13S. Hereupon, as laser beam L reciprocate through plate 15, it is converted into linearly polarized laser beam, with their oscillating direction turned 90°, by plate 15. Returned to surface 13S, the laser beam is transmitted through it to be introduced into prism member 19, which is bonded to surface 13S and serves to separate the beams. Then, the beams are incident on flat first reflecting surface 19A and cylindrical second reflecting surface 19B of prism member 19. Surfaces 19A and 19B adjoin at a certain angle to each other. The laser beam reflected by surfaces 19A and 19B pass again through polarizing surface 13S and are directed to photodetector 14. Recording/retrieving laser beam L is reflected and separated by first and second reflecting surfaces 19A and 19B. When objective lens 18 is in the focusing state, the separated laser beam reflected by surface 19A is converged, as laser beam Lf for focusing-error detection, on a photo in sensitive region between photosensitive regions 16A and 16B for focusing-error detection, as shown in FIG. 13A. When lens 18 is in the focusing state, moreover, the separated laser beam reflected by surface 19B is applied, as laser beam Lt for tracking-error detection, to photosensitive regions 17A and 17B for tracking-error detection, as shown in FIG. 13A. Since surfaces 19A and 19B are total-reflection surfaces, they are in contact with a space or gap.

Figure 13B:
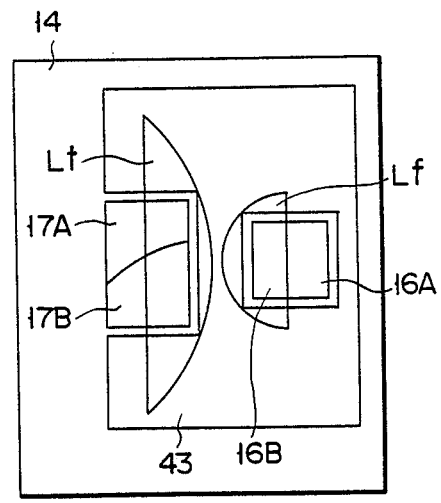

As shown in FIG. 13A, photodetector 14 is provided with additional detecting region 43, which detects an over-defocusing state such that lens 18 is located in a region remote from its focusing position and memory 1 or such that lens 18 is close to optical memory 1, thereby large focusing-error being produced. Laser beam Lf for focusing-error detection is deflected greatly due to a large focusing-error. Thus, a wide laser beam spot is formed on the photosensitive region to which beam Lf is directed, as shown in FIG. 13B. This beam spot, i.e., the over-defocusing state, is detected by additional detecting region 43. If laser beam Lf protrudes from photosensitive regions 16A, 16B, 17A and 17B for focusing- or tracking-error detection, so as to extend into region 43 around the photosensitive regions, then it indicates that there is a large focusing-error. Thereupon, the operation of a focusing servo loop for focusing-error correction is interrupted temporarily, and objective lens 18 is returned to its predetermined position. Then, the focusing servo loop is actuated again, in response to a focusing-error signal, so that lens 18 is kept in the focusing state. In the optical head shown in FIG. 11, objective lens 18 is kept in focus and directed toward a predetermined track, as the whole optical structure is moved vertically and horizontally.

As mentioned before, the focusing-error sensing capability is proportional to lateral image magnification $\alpha/\beta$ of the optical system through which the laser beam for focusing-error detection passes. In the optical head of FIG. 11, having an optical system for increasing magnification $\alpha/\beta$, therefore, focusing-errors can be detected with fully improved sensitivity.

As shown in FIG. 11, semiconductor element mount 20, used to support semiconductor laser 11 and photodetector 14, is fixed to frame 40, whose inner surface is worked with high accuracy. Mount 20 is sealed by hermetic seal member 42 for semiconductor-element protention. Also, objective lens 18 and other optical components are fixedly fitted in frame 40. With use of the optical system and the frame, constructed in this manner, optical head 5 can be reduced substantially in size, measuring 7 mm in diameter $\phi A$ and 10 mm in length B, for example. Prism 44 and photodetector 45 are arranged on the back of laser array 11. They servo to adjust the luminous intensity of laser beams L emitted from array 11. Further, mount 18 is provided with electrical terminal connector 46, which is used to fetch an output from the photodetector 14 and supply drive signals to semiconductor laser 11.

In assembling or adjusting the optical system shown in FIG. 11, the most essential point is to prevent objective lens 18 from causing coma aberration, attributed to misalignment of the optical axis. As long as the frame is worked with high accuracy, and that the optical components are fitted accurately in the frame, production of coma aberration can be prevented securely by only locating the light emitting point of semiconductor laser 11 exactly on the optical axis.

According to the embodiment described above, the various components of the optical system of the optical head are assembled in one frame, thus permitting reduction in size of the optical head. Since the optical components are relatively few, the optical head can be light in weight. Accordingly, information in the optical memory can be accessed more quickly, that is, the access time can be shortened.

Referring now to FIG. 14, a compact optical system according to a still further embodiment of the present invention will be described. In the optical system shown in FIG. 14, arranged without the use of convex lens 12, the focus is detected by the astigmatism method, as in the case of the optical system shown in FIG. 9. In the system of FIG. 14, prism member 19 is provided on polarizing surface 13S of beam splitter 13. The reflecting surface 19A of member 19 is in the form of a cylindrical concave-lens surface. The base line of the concave-lens surface is coupled to surface 13S of splitter 13, so as to extend at an angle of about 45° to a plane which contains an optical axis extending objective lens 18, on surface 13S, and an optical axis extending from the light emitting point of semiconductor laser 11.

Also in the optical system shown in FIG. 14, the tracking guide and focus can be detected accurately. Since the laser beams are spread out when they are directed to photodetector 14, moreover, the tracking-guide sensing capability is improved.

In the optical system shown in FIG. 11 or FIG. 14, the back of prism member 19 may be defined by a flat surface or a plurality of surfaces, and an astigmatism lens such as a cylindrical concave lens may be located between semiconductor laser 11 or 16 and polarizing prism 13. Alternatively, moreover, an astigmatism lens such as a cylindrical convex lens may be located between polarizing prism 13 and quarter-wave plate 15. The base lines of both lenses are arranged unparallel to each other. According to the system shown in FIG. 14, the focusing state can be detected by the astigmatism method, as in the case of the optical system of FIG. 9. Moreover, the cross section of the laser beam is changed from an elliptic shape to a circular one, and the beam is increased in diameter, as it is directed to a photodetector. Accordingly, the image magnification of the optical system is enlarged on the photodetector in respect to the optical memory, so that the focusing-error sensing capability of the system can be improved.

Optical head 5 is incorporated, for example, in drive mechanism 51, as shown in FIG. 15. Thus, head 5 is driven by mechanism 51. In mechanism 51, guide frame 6, made of permeable material, is fixed in box-shaped yoke 52. Frame 6 is formed of two parallel guide yokes 54-1, 54-2 acting as guide rails, extending in the X-direction of FIG. 15. Plate-shaped permanent magnets 53-1, 53-2 are arranged between guide yokes 54-1, 54-2 and elongated yoke sections 52-1, 52-2 of yoke 52, in the Y-direction.

A first magnetic circuit is formed by first permanent magnet 53-1, first guide yoke 54-1 and first elongated yoke section 52-1 and second magnetic circuit is also formed by second permanent magnet 53-2, second elongated yoke section 52-2 and second guide yoke 54-2. Therefore, a first magnetic field is produced in the Y-direction, in a first gap space 55-1 between first permanent magnet 53-1 and guide yoke 54-1 and a second magnetic field is also produced in the Y-direction, in a second gap space 55-2 between second permanent magnetic 53-2 and second guide yoke 54-2. Disposed between guide yokes 54-1, 54-2 is head frame 40 which contains prism 13, mount 20, and other optical members. Over the head frame, objective lens 18 is mounted on objective-lens supporting member 61. Frame 40 is formed with opening 65 which, facing lens 18, secures an optical path between lens 18 and prism 13 fixed in frame 40. Supporting member 61 is fixed to saddle-shaped coil 57, which extends between the top faces of yokes 54-1, 54-2 and along the inside faces thereof, opposed to their corresponding magnets 53. Head frame 40 is supported by a pair of coils 59, which are wound around yokes 54-1, 54-2 so as to extend parallel to each other, and which serve to drive optical head 5. Coils 59 can move together with frame 40, along yokes 54-1, 54-2 or in the Y-direction. Coil 57 is coupled to coils 59 by means of spring members 62 so that objective lens 18 can move at least along its optical axis or in the Z-direction of FIG. 15. Coils 57 and 59, spring members 62, and lens supporting member 61 constitute carrier block 7, which carries the optical head, as shown in FIG. 1.

Part of each head driving coil 59 extends in the Z-direction, within gap spaces 55-1, 55-2 of magnetic circuit in which the magnetic field is generated in the Y-direction. When coils 59 are energized in response to a access signal from CPU 90, therefore, they are subjected to a transporting force in the X-direction. As a result, head frame 40, which is movable with coils 59, is transported in the X-direction along guide yokes 54-1, 54-2 to access a predetermined tracking guide. In an access mode, head frame 40 is substantially located under the predetermined tracking guide to be accessed.

In a tracking mode, coils 59 are energized in response to a tracking-error signal from tracking-error signal generator 74 and head frame 40 is minutely vibrated so that objective lens 18 is directed to a predetermined tracking guide and the predetermined tracking guide is correctly traced by the laser beam.

Also, part of saddle-shaped coil 57 extends in the X-direction within gap spaces 55-1, 55-2. When coil 57 is energized in response to a focusing signal, therefore, it is subjected to a force in the Z-direction. Thereupon, lens 18, which is supported by spring members 62 so as to be movable with coil 57, is deviated at least in the Z-direction. Thus, lens 18 is moved so that it is maintained in a focusing state.

If a tracking-error is caused by deviation of optical disk 1 or the like, it is corrected by driving head frame 40. Such tracking-error correction requires highband response, which can be attained by increasing the driving force or the number of turns of head driving coils 59, and reducing the weight of the moving parts. Since a common magentic field is generated in gap spaces 55-1, 55-2, working forces for correcting focusing-errors in the Z-direction and tracking-errors in the X-direction can be produced efficiently. Thus, drive mechanism 51 can be made compact.

Since head frame 40 is disposed between yokes 54-1, 54-2, which are made of high-premeability material, leakage flux from gap spaces 55-1, 55-2 can be prevented from reaching frame 40 or objective lens 18.

Referring again to FIG. 1, the operation of the information recording/retrieveing apparatus will now be described. In the access mode, CPU 90 receives a access program for moving optical head 5 to access tracking guide, from memory 70. Then, CPU 90 generates an access mode signal to analog switch unit 79 to connect CPU 90 to optical-head driver circuit 72 through D/A converter 71. CPU 90 also generates a access signal to optical head driver circuit 72 through D/A converter 71 so that circuit 72 is actuated. The circuit 72 generates a drive signal to head driving coil 59. As a result, head 5 is transported in the direction of arrow Tr, i.e., X-direction shown in FIG. 15 along guide frame 6. In the access mode, the track guides are counted, starting from a predetermined position or a previously accessed tracking guide. Thus, the tracking guides, to which head 5 is directed, are recognized one after another. In order words, output signals from tracking-error signal generator 74 are binary-coded by binary encoder 76, which generates one pulse each time head 5 crosses one tracking guide. The pulses, and hence the tracking guides, are counted by track number counter 77. CPU 90 generates the tracking mode signal to analog switch unit 79 to change an operation mode from the access mode to the tracking mode, when track number counter 77 generates a stop signal to stop the access movement of the optical head 5 after the end of acess. Switch unit 79 connects tracking-error signal generator 74 to optical head driver circuit 72 in response to the tracking mode signal. Thus, the correction of a tracking-error is started. Photoelectric signals delivered from photodetector 14 are amplified by preamplifier array 77, and processed by arithmetic circuit 78, including adders and other elements, as described before. The processed signals are supplied to signal generator 74, whereupon generator 74 delivers a tracking-error signal. The tracking-error signal is supplied through analog switch unit 79 to driver circuit 72 for moving optical head 5. As a head 5 is moved, thus correcting the tracking-error. If objective lens 18 is in the defocusing state, head 5 is moved in the direction of arrow Fc by objective-lens driver circuit 81, in response to a focusing-error signal from focusing-error signal generator 80. Thereupon, lens 18 is kept in the focusing state. Immediately before the focusing servo loop is closed, switch unit 79 is shifted so that objective lens driver circuit 81 is connected to automatic lead-in circuit 82. As a result, circuit 82 is actuated, so that objective lens 18 is returned to its initial position.

Recording beam intensity setter 83 is supplied with a recording signal from an external device, e.g., a keyboard (not shown), via interface 84 and recording signal processor 85 for generating a recording signal. The recording signal is responsive to information to be stored in the optical memory and an actuating signal corresponding to the recording signal is supplied to the laser 11 from laser unit actuator 89 so that the recording laser beam is emitted from the laser 11. In response to a command supplied externally through interface 84, a retrieving-mode signal is delivered from retrieving beam intensity setter 87 so that a predetermined signal is supplied to laser 11 from actuator 89. Analog switch unit 88 is shifted in response to commands for individual modes from CPU 90, so that the corresponding signals are supplied to laser unit actuator 89. The signals processed by arithmetic circuit 78 are read by information signal reader 91, and binary-coded by binary encoder 92. Then, the signals are supplied to information signal processor 93 for modulation and demodulation of information signals and for error correction. Thereupon, the signals are converted into a regenerative signal, which is delivered to the external device through interface 84.

In the optical system shown in FIG. 11 or FIG. 14, semiconductor laser 11, polarizing prism 13, quarter wave plate 15 and objective lens 18 are assembled into a single structure. Accordingly, the single structure may be transported and moved to correct the focusing and tracking-errors. That is, frame 40 shown in FIG. 11 may be fixed to supporting member 61 shown in FIG. 15 instead of objective lens 18 and may be movably supported by the spring members 62. In this modification, frame 40 can be moved along the Z-direction and transported along the X-direction by coils 57, 59 so that the focusing and tracking-error is corrected.

Thus, according to the present invention, there may be provided an optical head which is simple in construction, thus permitting reduction in size and weight and hence, shorter access time.

What is claimed is:

1. An optical system for retrieving information from an optical memory, comprising:
    means for generating a polarized light beam having a first polarization plane;
    means for allowing the light beam to pass therethrough and rotating the first polarization plane of the light beam;
    means for converging the polarized light beam passing through said rotating means onto the optical memory and transferring the light beam reflected from the optical memory to said rotating means, the polarized and reflected light beam passing through said rotating means so that the first polarization plane of the reflected light beam is also rotated into a second polarization plane perpendicular to the first polarization plane;
    means for detecting the polarized light beam having the second polarization plane; and
    means for guiding the light beams having the first and second polarization planes to said rotating means and said detecting means, respectively, which has first and second surfaces, the first surface allowing one of the light beams to pass therethrough and reflecting the other of the light beams, and the second surface reflecting the other of the light beams to the first surface.

2. An optical system according to claim 1, wherein said rotating means includes a quarter wave plate.

3. An optical system according to claim 1, further comprising a mount which is rotatable around an axis thereof, said light beam generating means and said detecting means being fixed to said rotatable mount.

4. An optical system according to claim 1, wherein said guiding means includes first and second prisms which are coupled to each other and have the first and second surfaces, respectively.

5. An optical system according to claim 1, wherein said guiding means, said rotating means, and said converting means are assembled in a single structure.

6. An optical system according to claim 1, wherein the first and second surfaces of said guiding means are unparallel to each other.

7. An optical system according to claim 1, wherein the first surface of said guiding means is a polarization surface.

8. An optical system according to claim 1, further comprising means for collimating the polarized light beam generated from said generating means, which is located between said generating means and said guiding means.

9. The optical system according to claim 1, wherein the converging means is a nonspherical lens.

10. The optical system according to claim 1, further comprising means for shaping the cross section of the light beam from the light emitting means into a predetermined configuration, and enlarging the beam size of the light beam emerging from the converging means.

11. An optical system according to claim 1, wherein the second surface is divided into first and second surface segments which intersect each other at a ridge line, the one of the light beams incident thereon being separated into first and second light beam segments which are directed in different directions.

12. An optical system according to claim 8, wherein the light beam having the second polarization plane and emerging from said guiding means is converged by said collimator means and the converged light beam is incident on said detecting means.

13. The optical system according to claim 9, wherein the nonspherical lens shapes the cross section of the light beam from the light emitting means into a predetermined configuration and enlarges the beam size of the light beam emerging from the converging means.

14. The optical system according to claim 10, wherein said shaping means includes cylindrical convex and concave lenses.

15. The optical system according to claim 10, wherein said shaping means includes a refracting optical member having a surface at which the light beam is refracted.

16. An optical system according to claim 11, wherein the first surface segment is formed into a non-spherical surface for applying astigmatism to the light beam segment reflected therefrom.

17. The optical system according to claim 11, wherein the cylindrical surface has a base line, the converging means has a first optical axis and the light emitting means has a second optical axis, the base line being inclined at 45° to a plane defined by the first and second optical axes.

18. An optical system for retrieving information from an optical memory, comprising:
   means for generating a polarized light beam having a first polarization plane;
   means for allowing the light beam to pass therethrough and rotating the first polarization plane of the light beam;
   means for converging the polarized light beam passing through said rotating means onto the optical memory and transferring the light beam reflected from the optical memory to said rotating means, the polarized and reflected light beam passing through said rotating means so that the first polarization plane of the reflected light beam is also rotated into a second polarization plane perpendicular to the first polarization plane;
   means for detecting the polarized light beam having the second polarization plane; and
   means for guiding the light beams having the first and second polarization planes to said rotating means and said detecting means, respectively, which has first and second surfaces, the first surface allowing one of the light beams to pass therethrough and reflecting the other of the light beams, and the second surface reflecting the other of the light beams to the first surface, one of the surfaces being formed into a nonspherical surface to apply astigmatism to the light beam reflected therefrom.

19. An optical system according to claim 18, wherein the nonspherical surface is a cylindrical surface.

20. An optical system according to claim 18, wherein the nonspherical surface is a concave surface.

21. An optical system according to claim 18, wherein the nonspherical surface is a convex surface.

22. An optical system according to claim 18, wherein said rotating means includes a quarter wave plate.

23. An optical system according to claim 18, further comprising a mount which is rotatable around an axis thereof, said light beam generating means and said detecting means being fixed to said rotatable mount.

24. An optical system according to claim 18, wherein said guiding means includes first and second prisms which are coupled to each other and have the first and second surfaces, respectively.

25. An optical system according to claim 18, wherein said guiding means, said rotating means and said converting means are assembled in a single structure.

26. An optical system according to claim 18, wherein the first and second surfaces of said guiding means are arranged in parallel to each other.

27. An optical system according to claim 18, wherein the first surface of said guiding means is a polarization surface.

28. An optical system according to claim 18, further comprising means for collimating the polarized light beam generated from said generating means, said collimating means being located between said generating means and said guiding means.

29. An optical system according to claim 28, wherein the light beam having the second polarization plane and emerging from said guiding means is converged by said collimating means and the converged light beam is incident on said detector means.

* * * * *